United States Patent
Posselius et al.

(10) Patent No.: US 7,513,521 B2
(45) Date of Patent: Apr. 7, 2009

(54) SUSPENDED DRAWBAR CONTROL WITH SELECTABLE OPERATING MODES

(75) Inventors: John H. Posselius, Ephrata, PA (US); Christopher A. Foster, Akron, PA (US); Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 235 days.

(21) Appl. No.: 11/528,221

(22) Filed: Sep. 26, 2006

(65) Prior Publication Data

US 2008/0121401 A1    May 29, 2008

(51) Int. Cl.
*B62D 13/00* (2006.01)

(52) U.S. Cl. .................. 280/463; 446/468; 446/474

(58) Field of Classification Search .......... 280/446.1, 280/439, 483, 468, 463, 474, 462, 455.1
See application file for complete search history.

(56) References Cited

U.S. PATENT DOCUMENTS

| | | | | |
|---|---|---|---|---|
| 2,600,016 | A * | 6/1952 | Miller | 280/468 |
| 2,809,573 | A | 10/1957 | Bopf | 97/46.27 |
| 3,244,434 | A | 4/1966 | Reed et al. | 280/446 |
| 3,517,943 | A | 6/1970 | Bunting et al. | 280/405 |
| 3,649,048 | A | 3/1972 | Garnett | 280/477 |
| 4,132,273 | A | 1/1979 | Mortonson | 172/2 |
| 4,196,917 | A * | 4/1980 | Oakes et al. | 280/463 |
| 5,152,347 | A | 10/1992 | Miller | 172/7 |
| 5,462,486 | A | 10/1995 | Norton | 460/20 |
| 6,283,489 | B1 * | 9/2001 | Hoog | 280/455.1 |
| 6,443,475 | B1 * | 9/2002 | Fegley | 280/468 |
| 6,536,793 | B2 * | 3/2003 | Sargent | 280/455.1 |
| 6,698,524 | B2 | 3/2004 | Bernhardt et al. | 172/7 |
| 6,698,784 | B2 * | 3/2004 | Workman | 280/479.1 |
| 2003/0067141 | A1 * | 4/2003 | Workman | 280/482 |
| 2008/0106063 | A1 * | 5/2008 | Bryce | 280/455.1 |

FOREIGN PATENT DOCUMENTS

| | | |
|---|---|---|
| DE | 3150335 | 7/1983 |
| DE | 4138485 | 6/1993 |
| EP | 0151506 | 8/1985 |
| GB | 2244906 | 12/1991 |

* cited by examiner

*Primary Examiner*—Paul N Dickson
*Assistant Examiner*—Tashiana Adams
(74) *Attorney, Agent, or Firm*—Patrick M. Sheldrake; John William Stader; Michael C. Harms

(57) ABSTRACT

A control for a drawbar of a hitch for a work machine, and at least one method of operation thereof, which provides operator selectable operating modes having different characteristics for different operating conditions and operator preferences, some of which modes being automatically adaptable for changing conditions, such as loading conditions and the like. Selectable operating modes can include, but are not limited to, a locked out mode; a stiffness mode; a position limited mode; a varying load mode; and an active mode.

32 Claims, 9 Drawing Sheets

SUSPENDED DRAWBAR CONTROL WITH SELECTABLE OPERATING MODES

TECHNICAL FIELD

The present invention relates generally to a control for a suspended drawbar of a work machine such as a tractor, and more particularly, to a control including a selectable control logic having several modes of operation adapted for accommodating a variety of operating conditions, including changing conditions, and machine operator preferences.

BACKGROUND ART

Work machines, particularly tractors for agriculture, construction, earthmoving, forestry, and other towing applications, have improved over the years, both as to comfort for the operator of the work machine, and as to stress and loads applied against the work machine itself and against trailers or implements towed thereby, particularly as the machine moves over rough or irregular terrain, and for increasing the efficiency of operation by allowing for increased operating speeds and less operator fatigue. In particular, it is known for a work machine or tractor to have an automatic or selectably variable suspension or ride control, to improve operator comfort and allow for faster over-ground speed. It is also known for a tractor to have a drawbar for towing trailers and implements, which is resiliently supported, and/or automatically variable in height, length and/or sideward position, for functions such as accommodating different trailers or implements, loading conditions, and shock absorption. Reference in this regard, Bernhardt et al. U.S. Pat. No. 6,698,524 entitled Implement Hitch and Control System which is automatically operable for controlling the length of coupling elements of the hitch as a function of sensed forces applied against the coupling elements and position of an implement towed by the hitch, for controlling parameters including the operating line of draft forces acting on the hitch, towing point position, and/or inclination of a towed implement.

However, it has been found that even with a controlled suspension and/or ride control, and an automatically controllable hitch or drawbar, the automatic hitch or drawbar control may not suit individual operator preferences, and/or may not provide sufficient adaptability, either manual or automatic, for accommodating changing load and/or other operating conditions, such as braking and/or gear shifts/clutch operation. For instance, a towed trailer or implement, particularly a heavy one, or one which exerts a heavy load on the towing tractor, or a varying load thereon, can exert different forces and loads in different ways on a drawbar and thus on the towing vehicle, such as a tractor, as a result of a variety of factors. As an example, a drawbar control mode may be well suited for travel over paved roads, such as for travel between fields, involving only infrequent or occasional stopping, slowing and turning, but may be less suited to travel over irregular terrain such as a cultivated field wherein the drawbar is subjected to frequent jerking or jarring. Conversely, a control mode suitable for travel over rough or irregular terrain may be less suited for travel over smooth roads. The wrong control mode for a hitch or drawbar can negatively affect ride quality, steering, stability, and handling of a tractor, and thus operator satisfaction.

Even when environmental conditions such as terrain are consistent, load conditions can vary widely over a relatively short time period, such as when a grain cart being towed by a tractor is being filled with grain by a combine, or a fertilizer spreader towed by a tractor is spreading fertilizer over a field. In this regard, a grain cart can be loaded within a few minutes with an amount of grain having a weight which is several times the weight of a tractor towing the cart, thereby greatly changing the load on the drawbar. A fertilizer spreader can carry a load of fertilizer having an initial weight which is also several times the weight of the tractor towing the spreader, but which is gradually reduced to a much lower weight over the course of the spreading operation, which will also change the drawbar load. Further, towed implements such as agricultural drills and planters will exert a varying load on the drawbar of the towing vehicle as disks, plows or other tools of the implement are lowered into and raised from the ground, or, while in the ground encounter changing soil conditions or buried obstructions such as roots and old fence posts.

Still further, operation of the towing vehicle itself, either alone, or in combination with any of the above factors, can result in changes in drawbar loading conditions. For instance, drawbar loads will change when the towing vehicle is braked, and/or the clutch is engaged and disengaged, such as when shifting gears.

As a result, it has been found that it would be desirable to have a control for a drawbar of a hitch of a work machine, such as a tractor, which provides different selectable operating modes suitable for a variety of different operating and/or load conditions, as well as operator preferences, which is optionally automatically adaptable for changing conditions, such as when the towing vehicle is braking and/or the clutch is engaged or disengaged, and which overcomes one or more of the problems and shortcomings set forth above.

SUMMARY OF THE INVENTION

What is disclosed is a control for a drawbar of a hitch for a work machine, such as a tractor, and at least one method of operation thereof, which provides operator selectable operating modes having different characteristics for different operating conditions and operator preferences, some of which modes being automatically adaptable for changing conditions, and which overcomes one or more of the problems and shortcomings set forth above.

According to a preferred aspect of the invention, a method for automatically controlling a movable drawbar of a work machine while towing a load with the drawbar, is disclosed. The method includes providing structure supporting the drawbar on the work machine for allowing relative movement therebetween responsive to varying loading conditions exerted between the load and the work machine, and monitoring information representative of a position of the drawbar in relation to a predetermined position during relative movement of the drawbar and the work machine responsive to loading conditions exerted between the load and the work machine. The method also includes automatically repositioning the drawbar to a position within a predetermined range including the predetermined position, responsive to information representative of at least movement of the drawbar beyond the predetermined range. Still further, the method includes a step of monitoring information representative of engagement and disengagement of a brake of the work machine and automatically holding the drawbar in a position responsive to engagement of the brake, and automatically releasing the drawbar responsive to disengagement of the brake.

According to another preferred aspect of the above method of the invention, the method can include additional steps of providing a device operable for resiliently absorbing energy of loading conditions exerted between the load and the work machine, and monitoring information representative of engagement and disengagement of a clutch of the work machine, and when the clutch is engaged, increasing a pressure condition in the device to a predetermined level for stiffening the resiliency thereof.

According to still another preferred aspect of the above method, when information representative of disengagement of the clutch and a predetermined condition are present, the pressure condition in the accumulator will be allowed to vary from the predetermined level. This predetermined condition can be a condition selected from a group consisting of an acceleration condition resulting from initial release of the clutch; a high engine load condition resulting from initial release of the clutch; a low travel speed; an elapsed time; and a drawbar position, or any other suitable condition as required or desired for a particular application.

According to still another preferred aspect of the above method, the step of automatically repositioning the drawbar to a position within a predetermined range including the predetermined position, is performed responsive to information representative of movement of the drawbar beyond the predetermined range for longer than a predetermined time. The step of automatically repositioning the drawbar to a position within a predetermined range, can also be performed responsive to information representative of the position of the drawbar over time. Still further, the step of automatically repositioning the drawbar to a position within a predetermined range, can be performed responsive to measured loading conditions on the drawbar. Or, the step of automatically repositioning the drawbar to a position within a predetermined range, can be performed responsive to loading conditions on the drawbar determined from conditions including at least a loading condition on an engine of the work machine and a selected gear of a transmission of the machine. Additionally, any combination of the above conditions can be used.

Here, it should be noted that the above method can be utilized for control of a drawbar of a work machine movable in any direction, including the fore and aft directions, as well as side to side and up and down directions.

According to another preferred aspect of the invention, a drawbar control includes structure supporting a drawbar in connection with a work machine for relative movements in opposite first and second directions, the drawbar being configured for attachment of a load to be towed to the work machine. The drawbar control additionally includes a fluid or oil circuit including at least one fluid cylinder having an element in connection with the drawbar for movement therewith in the first and second directions relative to the work machine, at least one valve operable for connecting at least one pressurized accumulator with the at least one fluid cylinder, at least one valve operable for connecting a source of pressurized fluid or oil to the at least one accumulator and to the at least one valve operable for connecting the at least one accumulator with the at least one fluid cylinder, the valves being operable for delivering pressurized fluid to the at least one fluid cylinder for moving the drawbar in the first direction relative to the work machine and in a second mode for moving the drawbar in the second direction relative to the work machine, and a controller automatically operable for controlling the valves in a selectable one of a plurality of operating modes. Preferred operating modes can include, for instance, (a) a locked out mode for maintaining the drawbar in a predetermined home position in relation to the structure supporting the drawbar in opposition to loading conditions exerted against the drawbar;

(b) a stiffness mode wherein the at least one accumulator is in fluid connection with the at least one fluid cylinder and a pressure condition in the at least one accumulator is controlled for providing a selectable amount of opposition to movement of the at least one fluid cylinder and the drawbar responsive to changing loading conditions exerted thereagainst;

(c) a position limited mode wherein the drawbar is allowed to move within a predetermined range of travel in relation to the structure supporting the drawbar responsive to loading conditions exerted against the drawbar;

(d) a varying load mode wherein the valves are automatically controlled by the controller to allow fluid in the at least one fluid cylinder to be displaced therefrom resiliently opposed by a pressure condition in the at least one pressurized accumulator in fluid connection with the at least one fluid cylinder, for resiliently opposing movement of the drawbar resulting from loading conditions exerted thereagainst by a load towed by the vehicle, wherein if the drawbar is moved by the loading conditions exerted thereagainst to a position beyond a predetermined range of positions longer than for a predetermined duration of time therefor, the controller will automatically control the valves to deliver pressurized fluid from the source thereof to the at least one fluid cylinder to return the drawbar to a position within the predetermined range; and (e) an active mode wherein a position representative of a position of the drawbar is monitored and a value representative of any acceleration of the drawbar relative to the work machine is determined, and the drawbar is automatically moved at a rate which is a function of at least the monitored position and the determined value representative of the acceleration of the drawbar.

When in the varying load mode, the controller logic automatically controls the valves to prevent movement of the at least one fluid cylinder and the drawbar when a brake of the machine is engaged. Also when in the varying load mode, the control logic automatically controls the valves to increase a pressure condition in the at least one pressurized accumulator responsive to engagement of a clutch of the vehicle, and maintain the increased pressure condition until after at least one condition representative of initial releasing of the clutch is present.

According to a still further preferred aspect of the invention, the fluid cylinder includes a first chamber or cavity into which pressurized fluid such as oil can be introduced and contained,-and a second chamber or cavity into which pressurized fluid can be introduced and contained. The at least one valve operable for connecting an accumulator with the at least one fluid cylinder includes a first lockout valve in fluid connection with the first chamber or cavity and a first accumulator, and a second lockout valve in fluid connection with the second chamber or cavity and a second accumulator. Each of the lockout valves includes a valve member selectably movable as controlled by the controller between a one-way flow position which allows only fluid flow from the chamber or cavity in fluid connection with the valve, and a two way flow position which allows fluid flow to and from the chamber or cavity in connection with the valve, the controller automatically operating to move both of the first and second lockout valves to the one-way flow positions thereof when the locked out mode is selected. The controller can additionally be programmed to automatically operate to move both of the first and second lockout valves to the two way flow positions thereof when the stiffness mode is selected. The at least one valve operable in a first mode for connecting a source of pressurized fluid to the at least one fluid cylinder can include a first position/stiffness valve disposed in fluid connection with the first lockout valve, the first accumulator and a source of the pressurized fluid; and a second position/stiffness valve disposed in fluid connection with the second lockout valve, the second accumulator and a source of the pressurized fluid. With this arrangement, when the stiffness mode is selected, the controller logic will automatically control the controller to operate the first and second position/stiffness valves to allow flow of the pressurized fluid to the accumulators for controlling the movement of the at least one fluid cylinder and the drawbar responsive to changing loading conditions exerted thereagainst.

According to a further preferred aspect of the invention, the control can include one or more operator input devices in connection with the controller and operable by an operator for inputting operator commands, for instance, selecting an operating mode or level of opposition to the movement of the at least one fluid cylinder and the drawbar when in the stiffness mode. Or, one or more of the operating modes can be automatically selected by the controller or another device, based on predetermined factors existent at any given time.

DETAILED DESCRIPTION OF THE INVENTION

Figure 1:
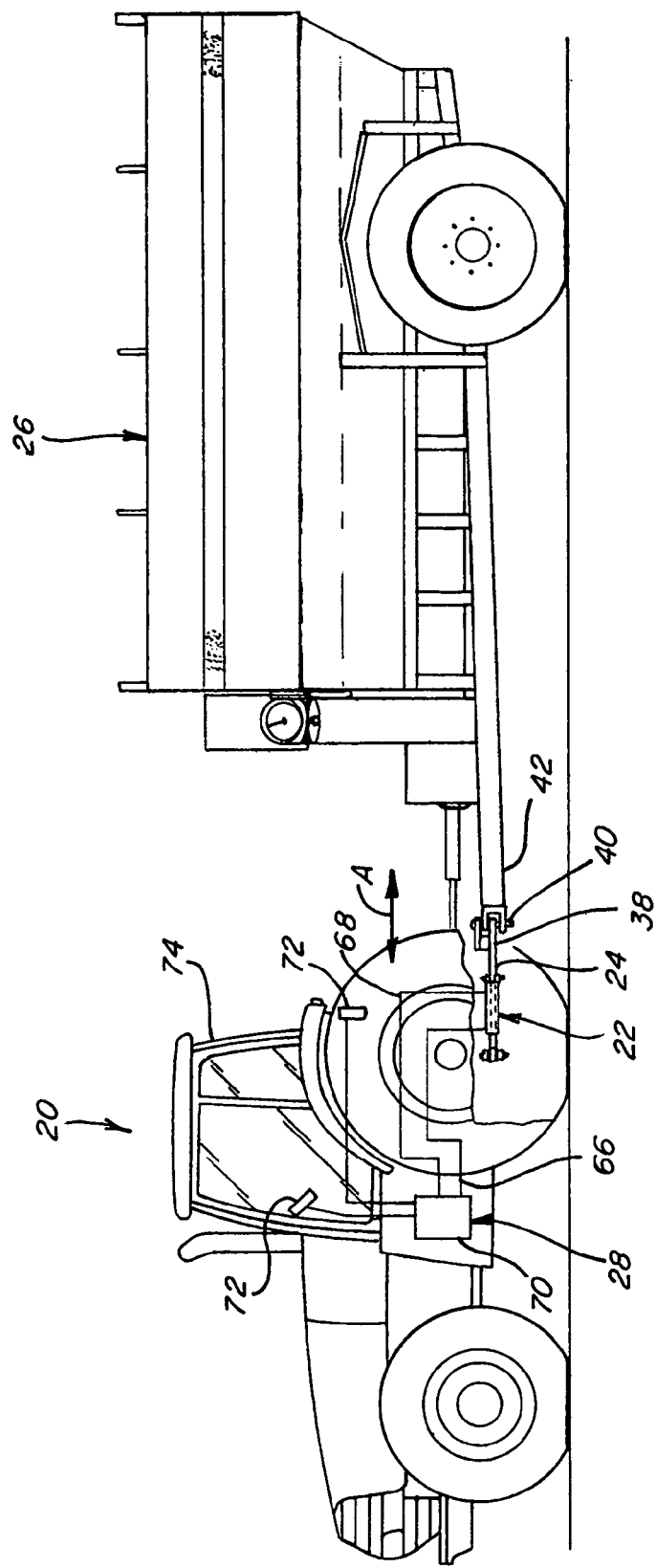
FIG. 1 is a fragmentary side view of a work machine including a drawbar controllable by a control of the invention and connected to a load to be towed by the work machine.

Referring now to the drawings, wherein like numerals refer to like parts, in FIG. 1 a work machine 20 is shown including a drawbar assembly 22 mounted on a lower rear end thereof and including an elongate drawbar 24 for connection of loads to be towed by work machine 20 in the well-known manner. Here, work machine 20 is depicted as a common tractor usable in a variety of applications, including, but not limited to, agricultural, construction, earthmoving, mining and forestry applications. Also here, a representative load is illustrated connected to work machine 20 by drawbar 24, which is a common grain cart 26 utilized in agricultural applications for hauling material such as grain, granulated fertilizer and other material, during the course of day-to-day activities common to a farming operation. It should be noted that loads commonly towed by work machines, such as work machine 20, as illustrated by grain cart 26, can exert significant, widely varying loading conditions in both the fore and aft directions, as well as the side to side and vertical directions, on the work machine as it tows the load during the course of the farming operation. In this regard, for instance, the work machine may be used for towing an empty grain cart across the relatively rough terrain of a harvested agricultural field to a harvesting machine. The work machine may then tow the grain cart alongside a harvesting machine as the harvesting machine unloads grain into the grain cart. When loaded, the grain cart can have a weight which is several times that of work machine 20. The much heavier grain cart 26 will then be towed across the rough terrain of the harvested field to another location. This may entail traversing surface irregularities such as ditches, gullies, furrows, and the like, as well as smoother road surfaces. Additionally, at various times over the course of such travel the brakes and/or clutch of work machine 20 may be engaged as variously required for turning, slowing down, stopping, accelerating and shifting gears. As a result, widely varying loading conditions, including, but not limited to, pushing and pulling with substantial force, in the fore and aft, side to side, upward and downward directions, and combinations of these directions, will be exerted by cart 26 against drawbar 24 and thus work machine 20, and vice versa. The effects of such forces, i.e., jarring and jerking movements, have been found to diminish operator comfort and increase fatigue and wear and tear on both the operator and the work machine itself.

Similarly, other loads commonly towed by work machines such as work machine 20, which can include, for instance, other wheeled vehicles such as wagons, trailers and carts, and tools and implements such as agricultural planters, drills, cultivators, plows, subsurface rippers, and the like, can exert widely varying loading conditions on the towing machine through the drawbar. As an example, a loaded fertilizer cart or wagon towed over a field will exert differing loading conditions on the drawbar over time as the fertilizer is gradually distributed from the wagon. As another example, the towing loads exerted by an implement will vary widely depending on whether the tools of the implement are in contact with the field surface or raised thereabove. When in the soil, differing soil conditions such as density and composition, terrain, moisture content, state of cultivation, and subsurface conditions such as root structures, buried objects such as stones, stumps, fallen fence posts, and the like, will also exert varying loading conditions on the drawbar as tools and implements are pulled therethrough. Such changing loading conditions can be abrupt, shock or impact type loads, and they can be gradually changing. Such loading conditions may also be of high frequency, such as when the towed load is traversing a cultivated headland of a field, or more incidental or occasional, such as when a brake or clutch is engaged or disengaged. As a result, it has been found to be desirable to have a capability to select from at least two, and preferably more, modes of operation of a drawbar control, for adapting the operating characteristics of the drawbar to the current environment, and/or operator preferences.

Accordingly, to meet the above desire and otherwise improve drawbar operability, performance, ride quality, and the like, the present invention is directed to a control 28 for a drawbar of a work machine, such as, but not limited to, drawbar 24 of work machine 20, which provides several different operating modes for controlling and/or limiting movements of the drawbar responsive to varying or changing loading conditions exerted thereagainst by a towed load such as, but not limited to, cart 26.

Figure 2:
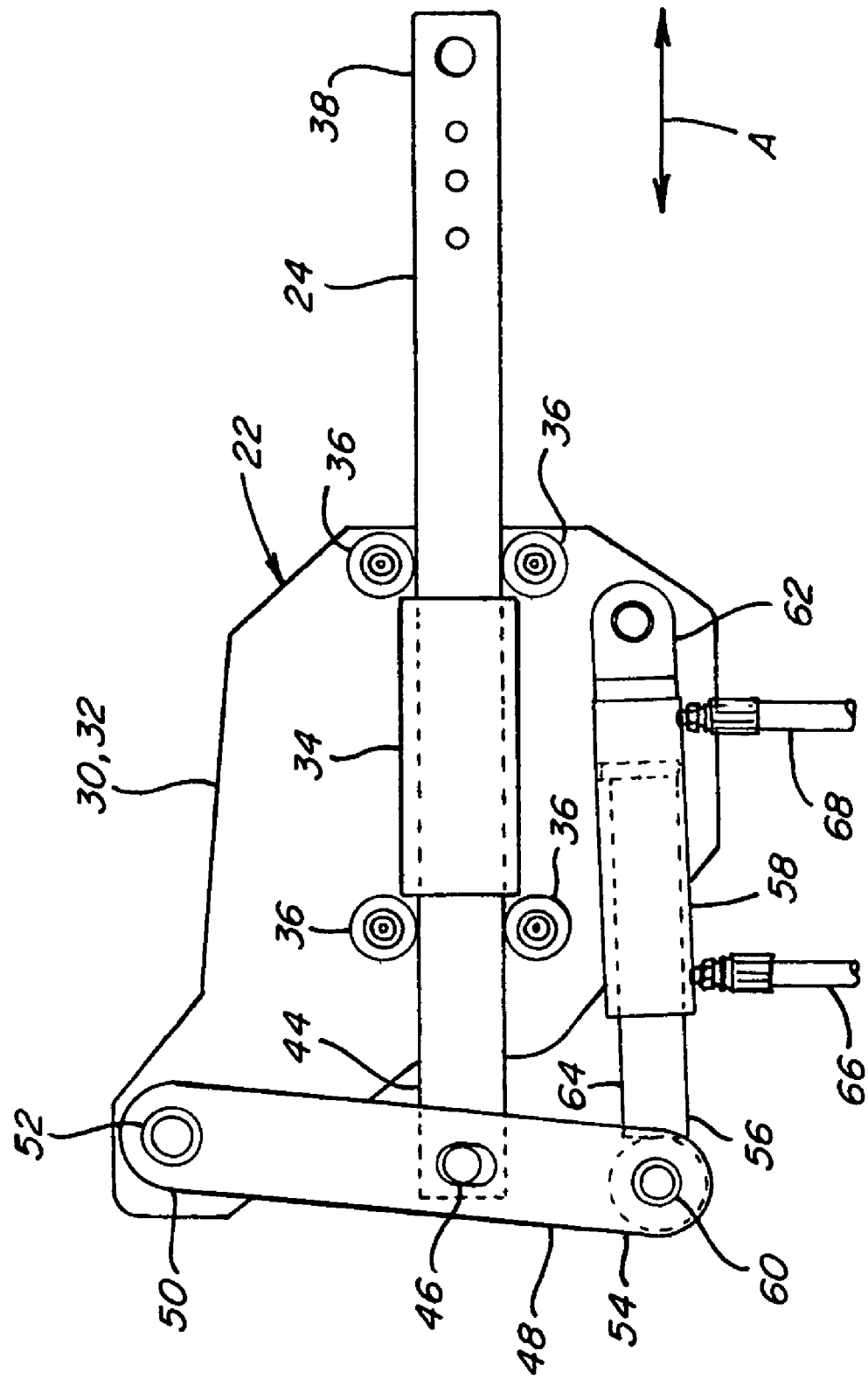
FIG. 2 is a simplified top view of the drawbar of FIG. 1, showing aspects of a drawbar and assembly including structure supporting the drawbar for fore and aft movement relative to the machine, and aspects of the control of the invention.

Referring also to FIG. 2, drawbar assembly 22 includes support structure 30 for supporting drawbar 24 on the rear end of work machine 20 for movement relative thereto in the fore and aft directions, as generally denoted by arrows A. Support structure 30 generally includes at least one mounting plate 32 on which a fore and aft extending rectangular sleeve 34 or other suitable structure is mounted. Sleeve 34 cooperatively receives drawbar 24 therethrough for slidable movement relative thereto in the fore and aft directions, while substantially limiting sideward and upward and downward movement of drawbar 24 relative to mounting plate 32. Mounting plate 32 additionally supports a plurality of guide rollers 36 for guiding the fore and aft movements of drawbar 24 relative to mounting plate 32. Here, it should be noted and understood that although support structure 30 prohibits sideward and upward and downward movements of drawbar 24 relative to mounting plate 32, control 28 of the invention can be used with a variety of alternative drawbar support structures, including, but not limited to, ones that would allow movement of a drawbar in one or more of these directions, and ones that are mounted so as to move with the drawbar in any of these directions. Drawbar 24 includes an aft end portion 38 including at least one hole therethrough adapted for receiving a pin, such a pin 40 (FIG. 1), for connection of a wagon, trailer or implement to be towed thereby, such as tongue 42 of grain cart 26 shown in FIG. 1. An opposite forward end portion 44 of drawbar 24 is connected by a pinned connection 46 to a drawbar link 48 for relative pivotal movement therebetween. A first end 50 of drawbar link 48 is pivotally mounted to mounting plate 32 by a pinned connection 52, and a second end 54 is pivotally connected to a rod end 56 of a fluid cylinder 58 by a pinned connection 60. A base 62 of fluid cylinder 58 is pivotally connected to mounting plate 32 by a pinned connection. Fluid cylinder 58 is an element of control 28. Here, it should be understood that control 28 of the invention can be utilized with a wide variety of drawbars and drawbar assemblies, and therefore is not limited to the construction disclosed herein. For instance, control 28 is usable with a drawbar assembly including more than one fluid cylinder. Additionally, here, fluid cylinder 58 is illustrated with rod end 56 in connection with link 48 and base 62 connected to mounting plate 32. Alternatively, the ends of fluid cylinder 58 can be reversed.

Essentially, in operation, any longitudinal movements of drawbar 24 as denoted by arrows A will effect a corresponding extension or retraction of a rod 64 of fluid cylinder 58, and any extension or retraction of rod 64 will effect a corresponding longitudinal movement of drawbar 24. Other aspects and elements of control 28 include one or more fluid control circuits in fluid connection with fluid cylinder 58, as illustrated by fluid lines 66 and 68; a controller 70, which can be, for instance, a microprocessor based controller, operable for automatically controlling fluid flow to and from cylinder 58 in several operating modes or arrangements; and one or more operator input devices, such as input devices 72, located in an operator cab 74 of the machine 20, and at the rear of the machine, respectively, and selectably operable for selecting an operating mode for control 28, which can include an operating mode wherein direct control of the extension and retraction of cylinder 58 is effected. Input devices 72 can include, for instance, one or more switches, or a touchscreen, or other well-known, commercially available operator input device.

Figure 3:
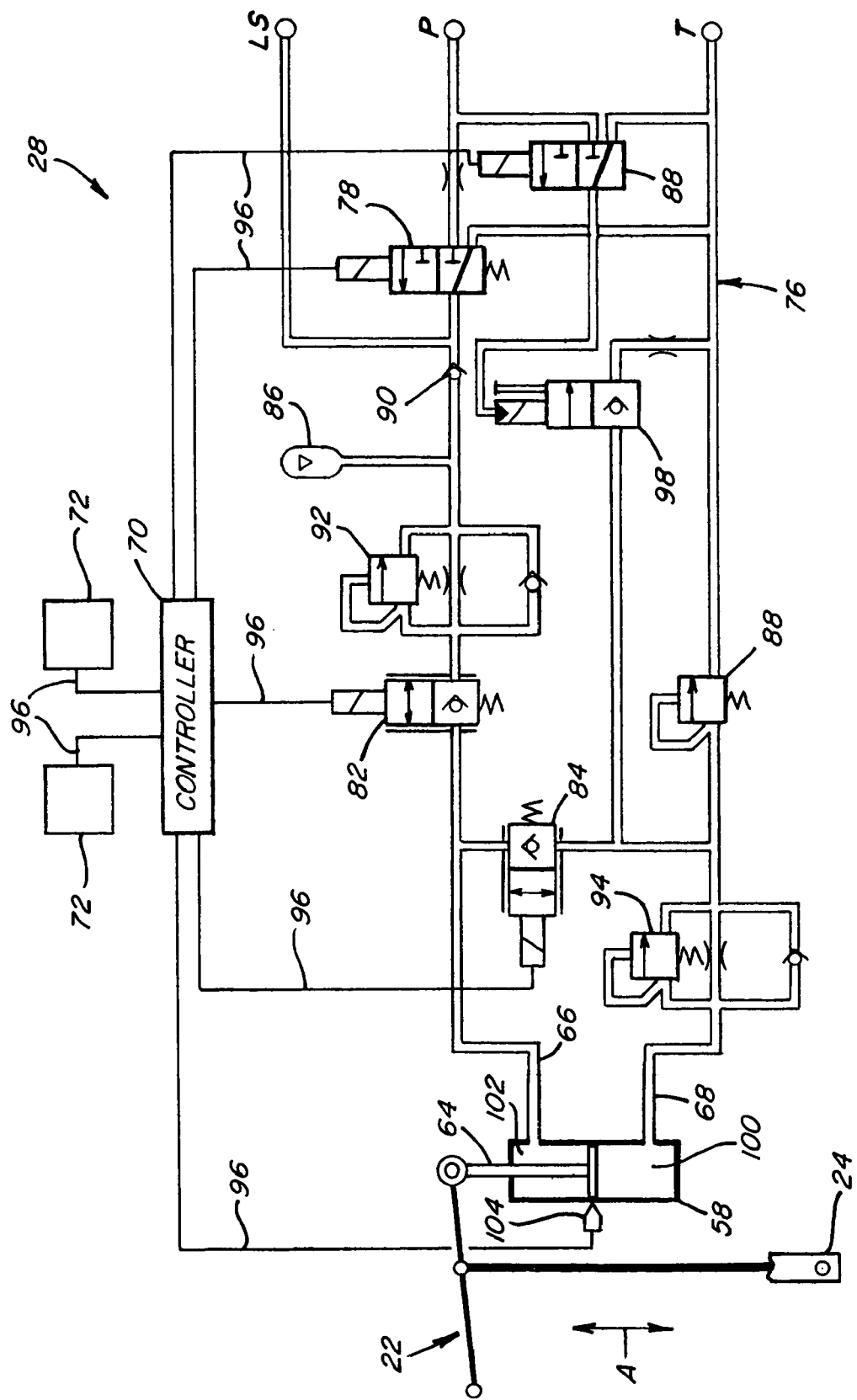
FIG. 3 is a simplified schematic diagram of aspects of the control of the invention.

Referring also to FIG. 3, a fluid control circuit 76 of control 28 is illustrated in connection with fluid cylinder 58. Drawbar 24 of drawbar assembly 22 is illustrated in connection with rod 64 of fluid cylinder 58, and is connectable to a load to be towed thereby, such as grain cart 26 illustrated in FIG. 1. Fluid control circuit 76 includes an extend valve 78, a retract valve 80, a first lockout valve 82, a second lockout valve 84, an accumulator 86, a system relief valve 88, a load check valve 90, and dampening valves 92 and 94. Controller 70 is connected to input devices 72, and connected in operative control of valves 78, 80, 82 and 84, via suitable conductive paths 96, which can be, for instance, wires of a wiring harness, or a wired or wireless network, such as a controller area network (CAN) or the like. Control circuit 76 additionally includes an unload valve 98. Fluid cylinder 58 has a base or piston end chamber 100, and a rod end chamber 102. Introduction of fluid into piston end chamber 100 and withdrawal of fluid from rod end chamber 102 will cause extension of fluid cylinder 58, which corresponds with retraction of drawbar 24. Introduction of fluid, such as a hydraulic fluid or oil, into rod end chamber 102 and withdrawal of fluid from piston end chamber 100 will cause retraction of cylinder 58, corresponding with extension of drawbar 24. However, it should be noted that these directions of extension and retraction can be reversed, as required or desired for a particular application. Extend and retract valves 78 and 80 are each a three way valve including a port in fluid connection with a source of pressurized fluid, which can be, for instance, a pump P, and a port in fluid connection with a suitable fluid repository, which here, is a tank T. Extend valve 78 includes a third port in fluid connection through load check valve 90 with accumulator 86 and a port of first lockout valve 82. First lockout valve 82 includes a second port in fluid connection with rod end chamber 102 of fluid cylinder 58. Retract valve 80 includes a third port in fluid connection with a signal port of unload valve 98, which is a two way valve. Valve 98 includes a port in fluid connection with tank T, and another port in fluid connection with piston end chamber 100 of fluid cylinder 58. Second lockout valve 84 includes a port in connection with first lockout valve 82 and rod end chamber 102, and a port in connection with valve 98, system relief valve 88 and piston end chamber 100.

Fluid control circuit 76 is operable under control of controller 70 in several operating modes for controlling or preventing or substantially limiting movement of drawbar 24 in the directions denoted by arrow A, including in a locked out mode wherein movement of drawbar 24 from a home position is hydraulically prevented; in a stiffness mode pressure in accumulator 86 is set to the desired stiffness to absorb instantaneous shock loading conditions up to a predetermined maximum pressure level determined by relief valve 88; a position limited mode wherein, as the name implies, travel of the drawbar is limited to a predetermined range of positions; an active or varying load mode in which resistance to movement of the drawbar is stiffened or relaxed responsive to certain loading conditions while maintaining the desired home position of the drawbar; and a manual drawbar positioning mode, which allows an operator to move the drawbar in the directions of arrow A, as desired or required for a particular purpose, such as aligning the drawbar with a load to be coupled thereto, such as tongue the 42 of cart 26. In this latter mode, input device 72 located at the rear of machine 20, or input device 72 in cab 74, can be used.

When the locked out mode is selected, extend and retract valves 78 and 80, and first and second lockout valves 82 and 84 are all de-energized, so as to be in the illustrated operating positions. That is, in the positions shown, valves 78 and 80 will block flow from pump P, but will allow flow to tank T. And, flow from fluid cylinder 58 will be blocked, except under high enough pressure conditions for system relief valve 88 to be opened. As a result, drawbar 24 will act as a fixed drawbar.

When the stiffness mode is selected, lockout valves 82 and 84 are energized so as to be moved to their upper and left hand positions, respectively, and controller 70 applies logic such that the initial pressure in the accumulator is set according to input by the operator to input device 72. The accumulator 88 will absorb instantaneous shock loads up to the maximum hydraulic pressure of the relief valve 88. While absorbing such shocks, fluid will be allowed to travel to and from both chambers 100 and 102 of fluid cylinder 58 into and out of accumulator 86. The instantaneous shock loading is measured as a function of linear displacement over a micro time base, as sensed by a position sensor 104 disposed and operable for sensing a position of a piston of cylinder 58 and outputting a signal representative thereof to controller 70 over a conductive path 96. The operator can select a predetermined pressure to be used, which establishes the stiffness. If the maximum system pressure is reached, the fluid will flow thru relief valve 88 to tank. In the stiffness mode, displacement can vary while drawbar stiffness is controlled.

When the position limited mode is selected, fluid control circuit 76 will be automatically configured and operate as explained above in reference to the stiffness mode. That is, lockout valves 82 and 84 are automatically energized. However, when a loading condition causes drawbar 24 to exceed an operator selected position range from a home position, such as, but not limited to, a range of plus or minus 25 mm, controller 70 will automatically de-energize either valves 82 or 84 to prevent drawbar from extending or retracting respectively beyond the allowable limits. Valve 82 or 84 will energize when the load on the drawbar returns the drawbar back within the allowable position range. This operating mode can be manually selected by the operator, utilizing input device 72, or automatically selected when a power take off of the work machine is engaged. In the position limited mode, pressure will vary while maximum displacement of the drawbar is controlled.

Figure 4:
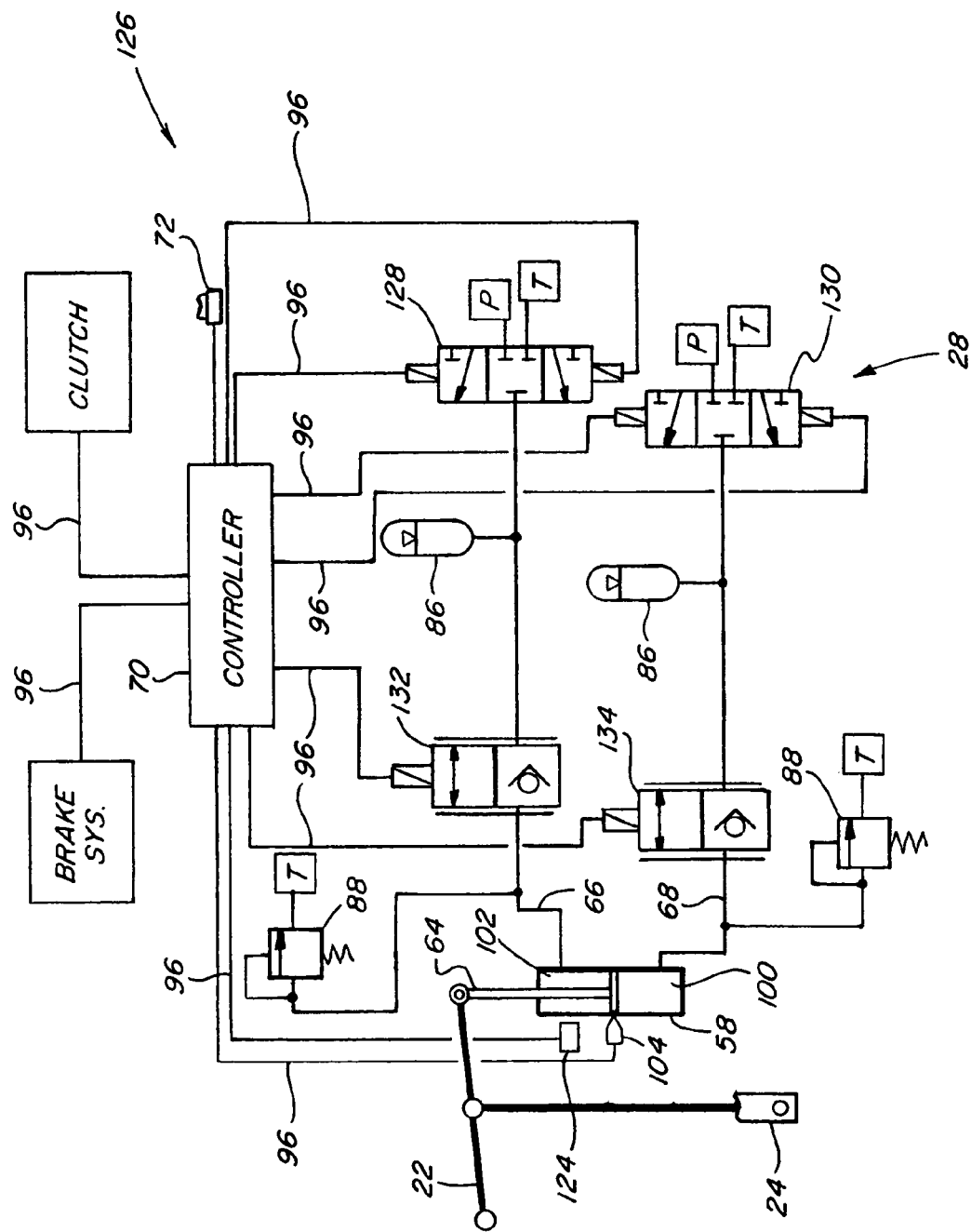
FIG. 4 is a simplified schematic diagram of other aspects of the control of the invention.

Referring also to FIG. 4, another fluid control circuit 126 adapted for automatic control by controller 70 for controlling drawbar 24 of drawbar assembly 22 in any of the operating modes discussed above, including in a locked out mode; a stiffness mode; and a position limited mode; a varying load mode; an active mode; and a manual mode, is shown. Components of fluid control circuit 126 include a first position/stiffness valve 128, a second position/stiffness valve 130; a pair of accumulators 86; a first proportional lockout valve 132; a second proportional lockout valve 134 and a pair of relief valves 88. Position/stiffness valves 128 and 130 are each a three-way, three port solenoid controlled valve, having ports on one side connected to pump P and tank T, respectively, and ports on an opposite side connected to valves 132 and 134, respectively, and to the accumulators 86, respectively. Lockout valves 132 and 134 are each a two way, two port, proportional operation solenoid controlled valve, and are connected to rod end chamber 102 and piston end chamber 100 of fluid cylinder 58, respectively, via fluid lines 66 and 68. Relief valves 88 are connected to lines 66 and 68 and to tank T. Controller 70 is connected in operative control of valves 128, 130, 132 and 134 via conductive paths 96. Controller 70 is also connected to an input device 72; a position sensor 104; and a brake system and a clutch or clutch actuator or controller of the work machine, via conductive paths 96.

In operation, input device 72 can be utilized for selecting an operating mode for controlling drawbar 24 via fluid control circuit 126, including, but not limited to, a locked out mode; a stiffness mode; a position limited mode; a varying load mode; an active mode; and a manual mode, and also for inputting information such as a selected home position, stiffness, or the like.

The varying load mode is essentially a position limited mode for loads which are increasing or decreasing at a relatively constant rate. When this mode is selected, lock out valves 132 and 134 are energized allowing flow from cylinder 58 to accumulators 86. In this mode, fluid control circuit 28 is automatically operated with the ability to increase stiffness response to varying steady state loads on drawbar 24, such as when cart 26 towed thereby is being loaded, a bale is being formed by a baler towed thereby, or the like, and to decrease the stiffness automatically with a decreasing loading condition on the drawbar, such as would occur as a large liquid manure spreader, or a chemical fertilizer spreader, is distributing its load over a field. The steady state loading condition on the drawbar is monitored over time, in relation to the known directional positional drift from the set home position. The home position is selected by the operator or can be predetermined. Determination of the required stiffness is done automatically by controller 70 by continuously measuring the drawbar position. Over a given time interval, if the drawbar position does not return to the set home position, the stiffness is automatically adjusted to reposition the drawbar to the set home position. Controller 70 causes drawbar 24 to extend by energizing valve 128 to the lower pressure position and valve 130 to the upper tank position to allow pressurized fluid to flow to chamber 102 of cylinder 58. Fluid from chamber 100 is allowed to flow to tank T. Retraction of drawbar 24 is effected by energizing valve 130 to the lower pressure position and valve 128 to the upper tank position to increase fluid volume in chamber 100, with fluid from chamber 102 being allowed to flow to tank T. In this operating mode, the instantaneous shock loads of the drawbar are absorbed while automatically maintaining the drawbar home position while drawbar steady state loads vary.

In the manual drawbar positioning mode, the operator has the ability to select the home position electrically, using either of input devices 72. This is similar to selecting the drawbar position via selecting pin holes on a standard hitch. Essentially, responsive to inputs received from a device 72, controller 70 will energizing valves 128 and 130 to pressure and tank positions, while lockout valves 132 and 134 are energized, until cylinder 58 positions the drawbar at a satisfactory position.

In the active mode, controller 70 will automatically monitor the instantaneous load conditions of the drawbar 24 or the cylinder 58. Information representative of the instantaneous loads exerted can be determined in a suitable manner, such as via a load sensor or cell, a pressure sensor, a strain gauge and/or an accelerometer as represented by sensor 124 in connection with controller 70 via conductive path 96. In the active mode the charge in the accumulators is maintained by valves 128 and 130. Proportional lock out valves 132 and 134 react to the instantaneous loads on the drawbar 24 and shift to allow appropriate amount of fluid flow to and from the cylinder 58 to and from accumulators 86. The valves are shifted as required to extend or retract the drawbar at a rate which is a function of the drawbar load and/or acceleration and drawbar position measured by sensors 104 and 124. When reacting to drawbar loads, as the sensor 104 detects that the cylinder is nearing the end of stroke, the valves 132 and 134 are shifted to allow a decreasing flow of fluid to and from the cylinder and accumulators. Thereby the drawbar acceleration as the cylinder comes to either ends of its stroke is minimized.

Figure 5:
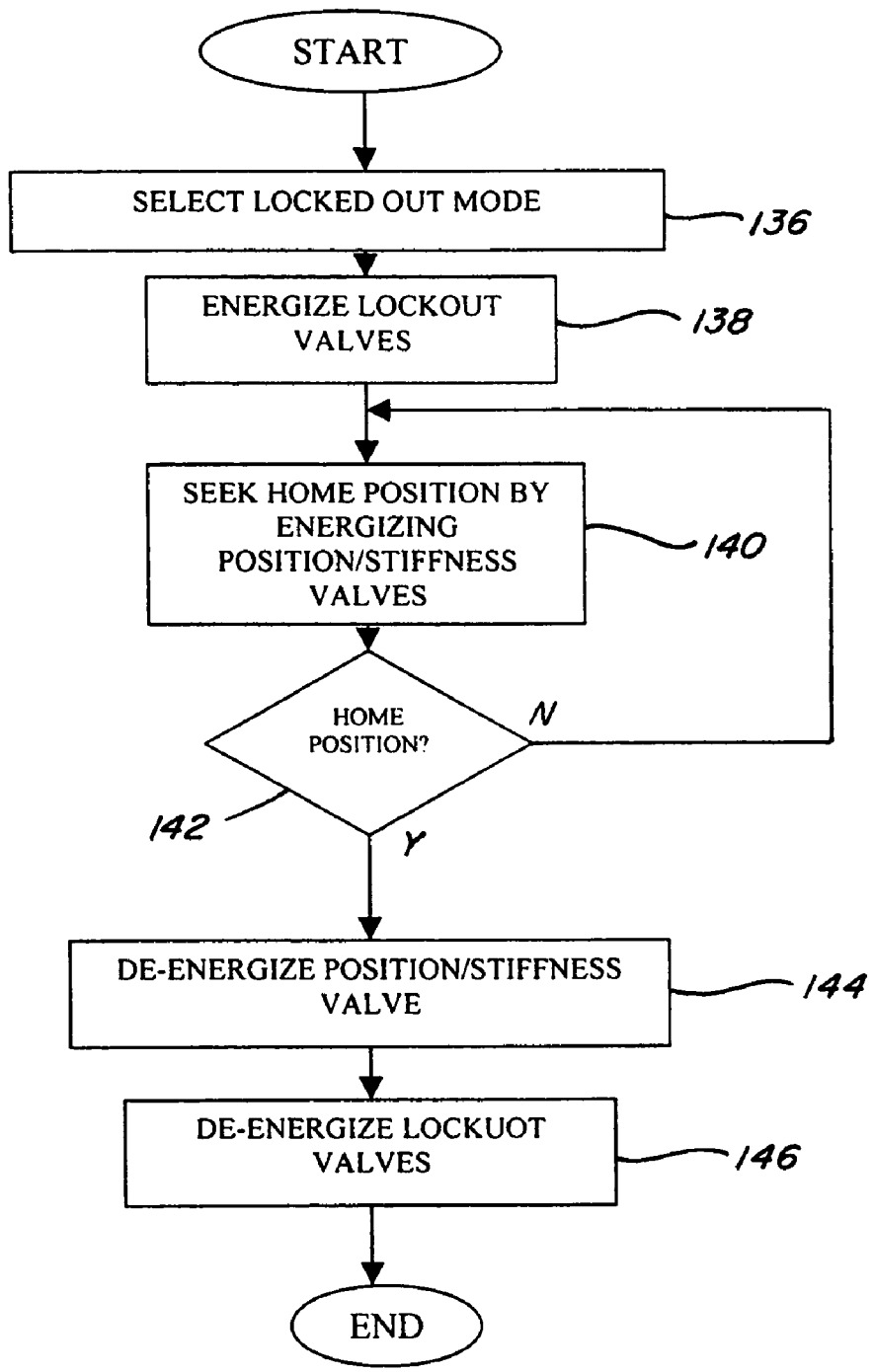
FIG. 5 is a high-level flow diagram showing steps of one mode of operation of the control of the invention.

Referring also to FIG. 5, steps of operation of fluid control circuit 126 in the locked out mode include first selecting that mode, as denoted at block 136. This can be done by an operator utilizing a suitable input device, such as input device 72. Responsive to selection of the locked out mode, controller 70 will automatically energize lockout valves 132 and 134 to move them to their upper positions, as denoted by block 138. This will enable extension and retraction of fluid cylinder 58, and thus movement of drawbar 24 by flow of fluid into and out of chambers 100 and 102. Controller 70 will then automatically energize and move position/stiffness valves 128 and 130 as required for seeking a home position for rod 64 of fluid cylinder 58 and drawbar 24, as denoted by block 140 and decision block 142. The home position can be predetermined or inputted by the operator, and the position of rod 64 and drawbar 24 can be determined utilizing position sensor 104. Because lockout valves 132 and 134 are proportionally operable, they can be variably controlled by application of a varying current thereto, to enable finely positioning rod 64 of fluid cylinder 58 and thus drawbar 24. When the home position is achieved, position/stiffness valves 128 and 130 are automatically de-energized by controller 70, as denoted at block 144. Lockout valves 132 and 134 are then de-energized by controller 70, as denoted at block 146, to lock cylinder rod 64 and drawbar 24 in the home position.

Figure 6:
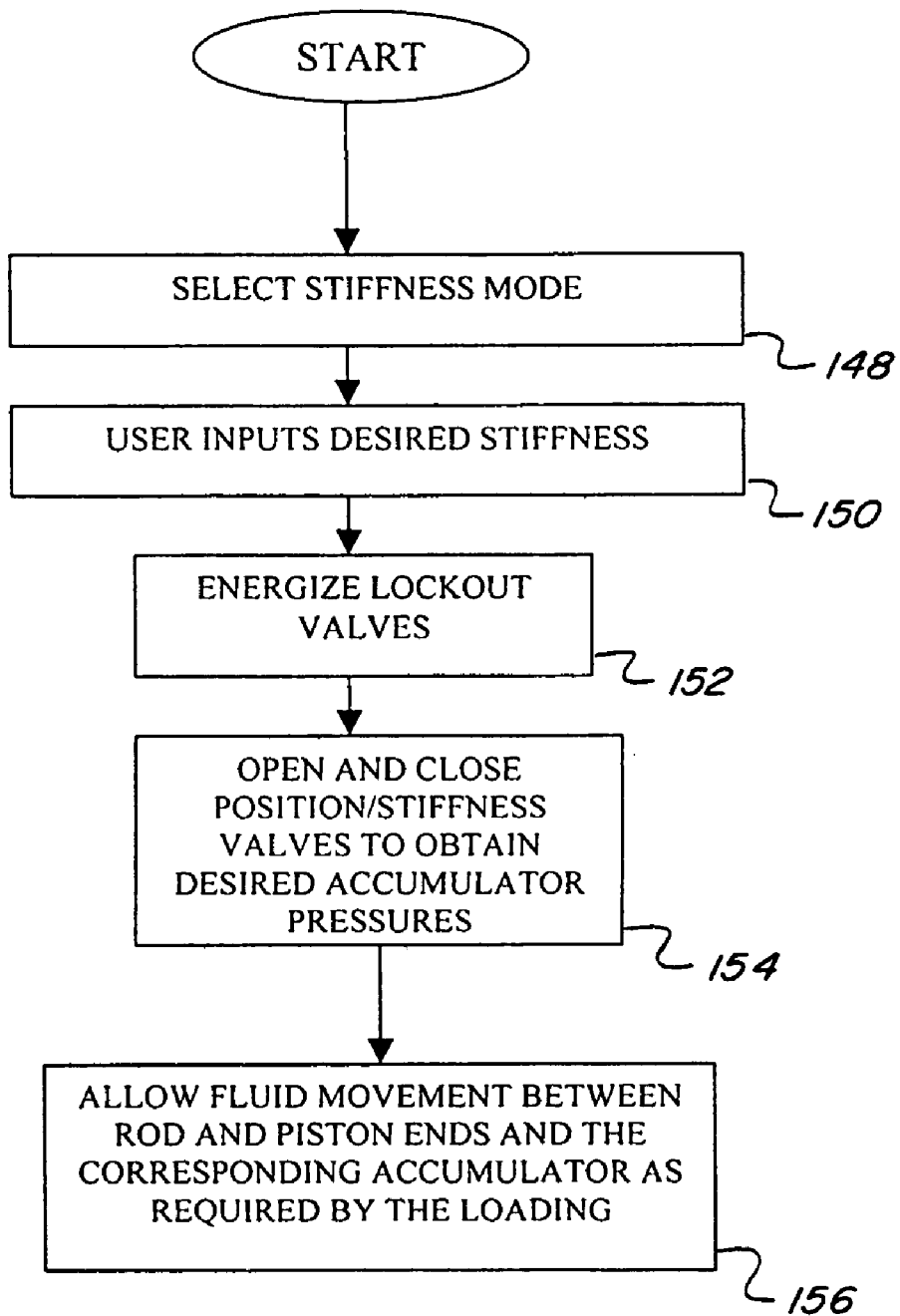
FIG. 6 is a high-level flow diagram showing steps of another mode of operation of the control of the invention.

Referring also to FIG. 6, steps of operation of fluid control circuit 126 when the pressure controlled or stiffness mode is selected are illustrated. After selection of the stiffness mode, as denoted by block 148, the user or operator inputs a desired stiffness value, as denoted at block 150. Controller 70 then responsively automatically energizes lockout valves 132 and 134, as denoted at block 152, to allow flow between fluid cylinder 58 and accumulators 86. Position/stiffness valves 128 and 130 are then automatically opened and closed by controller 70 as required to obtain desired pressures in accumulators 86, as denoted in block 154. Loading conditions exerted against drawbar 24 acting to extend rod 64 of fluid cylinder 58 will then be resisted by the pressure in the upper accumulator 86 in connection with lockout valve 132, and loading conditions exerted against drawbar 24 acting to retract rod 64 will be resisted by the pressure in the lower accumulator 86 in connection with lockout valve 134. This is denoted in block 156. Position/stiffness valves 128 and 130 can be opened and closed automatically by controller 70 as desired or required for achieving a desired stiffness. As a result, a home position is generally maintained plus or minus the required amount of travel of drawbar 24 and rod 64 required for absorbing instantaneous shock loading up to the pressure levels in the accumulators 86.

Figure 7:
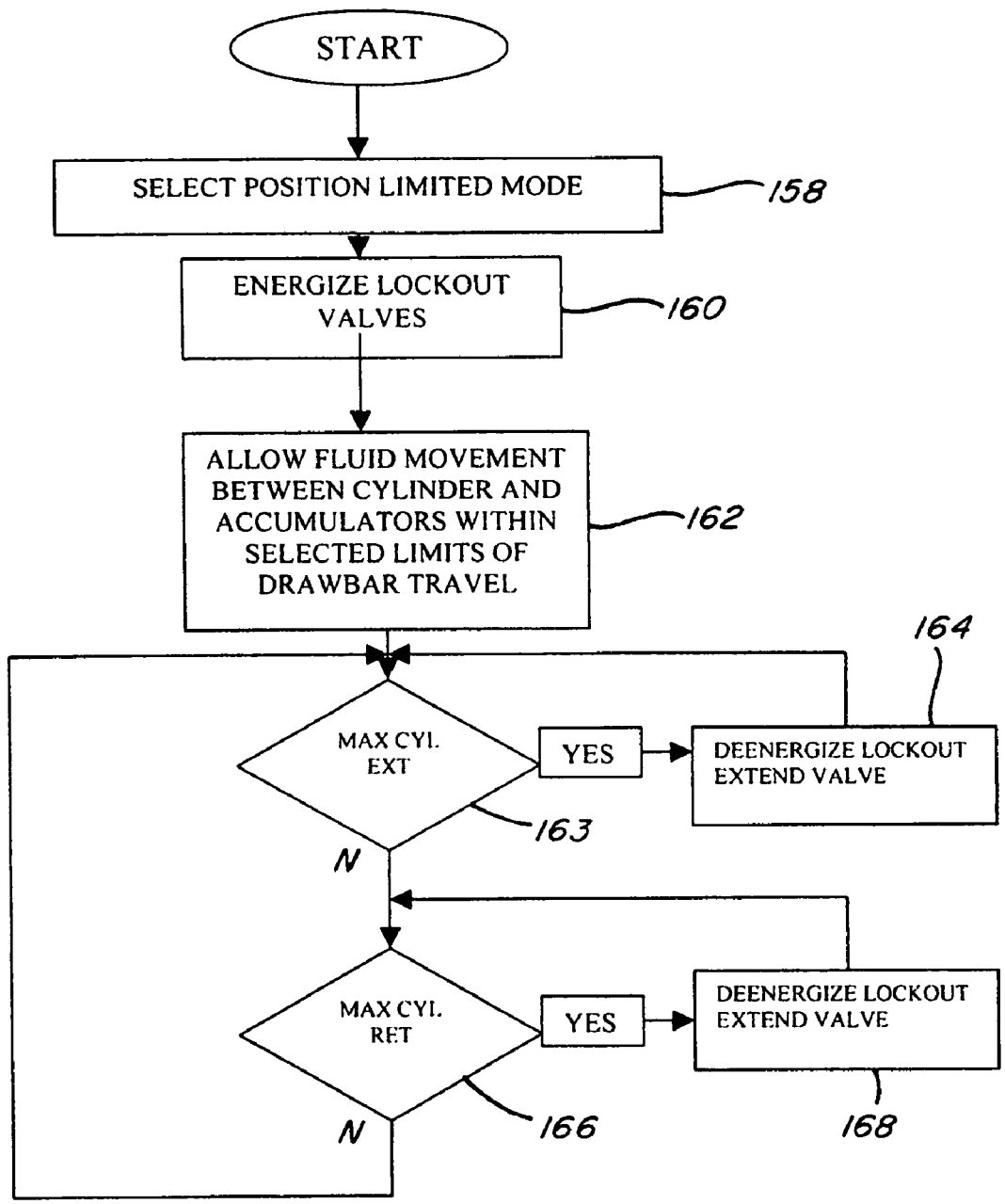
FIG. 7 is a high level flow diagram showing steps of still another mode of operation of the control of the invention.

In FIG. 7, steps of operation of fluid control circuit 126 when the position limited mode is selected, as denoted by block 158, are illustrated. As a first step, controller 70 automatically energizes lockout valves 132 and 134, as denoted at block 160. This will allow fluid movement between chambers 100 and 102 and accumulators 86, respectively, within selected limits for travel of drawbar 24, as determined by position sensor 104, as denoted at block 162. Essentially, controller 70 will monitor the signal of position sensor 104, and when the maximum cylinder extension is reached, as determined at decision block 162, indicating that drawbar 24 has reached its travel limit for retraction, controller 70 will de-energize lockout valve 132, as denoted at block 164, to prevent further extension of fluid cylinder 58 and retraction of drawbar 24. Similarly, when the maximum cylinder retraction is reached, as determined at decision block 166, corresponding to the maximum travel limit for extension of drawbar 24, controller 70 will de-energize lockout valve 134, as denoted at block 168, to prevent further retraction of fluid cylinder 58 and extension of drawbar 24. In both instances, when the lockout valve 132 or 134 is de-energized, so as to be in the lower position thereof, it will allow flow to the chamber of fluid cylinder 58 in connection therewith, but not further fluid flow therefrom.

Figure 8:
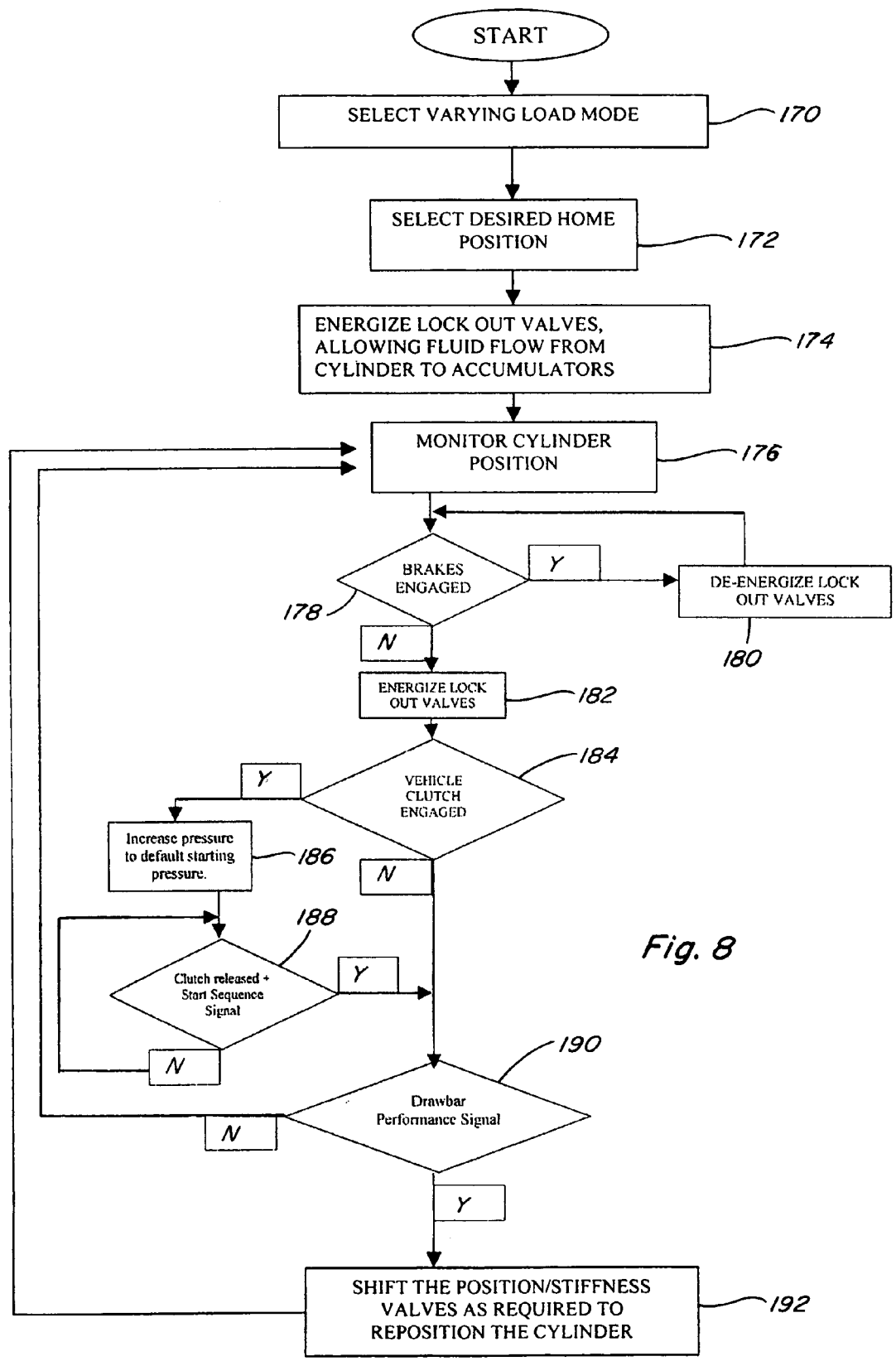
FIG. 8 is a high-level flow diagram showing steps of still another mode of operation of the control of the invention.

Referring also to FIG. 8, when the varying load mode is selected, as denoted at block 170, the operator can input a selected or desired home position, as denoted at block 172. Controller 70 will responsively automatically energize lockout valves 132 and 134 to allow fluid flow from the chambers of fluid cylinder 58 to accumulators 86, as denoted at block 174, and will monitor the position of rod 64, as denoted at block 176, via position sensor 104. In the event the brakes are engaged, as denoted at block 178, controller 70 will proceed to de-energize lockout valves 132 and 134, as denoted at block 180, and will continue to monitor engagement of the brakes in a looping routine. When the brakes are disengaged, controller 70 will automatically energize lockout valves 132 and 134, as denoted at block 182.

In the event the operator releases the clutch, a high drawbar loading condition may result as the work machine jerks or lurches forward or rearward. In this case, it will typically be desirable to increase accumulator pressure from normal operating levels used in returning the drawbar to the home position. To achieve this, when the operator engages in the clutch, controller 70 automatically increases the accumulator pressure setting to a default starting pressure, as denoted at decision block 184 and block 186. After achieving the higher accumulator pressure, controller 70 waits for a start sequence signal outputted by another system of the work machine, as denoted at decision block 188. This signal will be indicative of whether the initial acceleration from releasing the clutch has occurred. The start sequence signal can be derived, for instance, from data or information relating to any of the following conditions: engine load (will be high during initial clutch release); an accelerometer output value (also will be high during initial clutch release); travel speed versus gear selection information (i.e., speed is slower than desired speed at the initial clutch release); elapsed time since clutch has been released (a set time can be determined for acceleration due to clutch release); and drawbar position (drawbar will be retracted after the initial acceleration from clutch release). When the start sequence signal is present, controller 70 will automatically return to the normal sequence of steps, to monitor a drawbar position signal, as denoted at decision block 190. The drawbar position signal is representative of the current drawbar position, and can be determined from, for instance, the output of position sensor 104. From the drawbar position signal, controller 70 determines whether the position needs to be adjusted as a result of a change in the loading condition on the drawbar, and will shift or actuate position/stiffness valves 128 and/or 130, as required for repositioning the drawbar to the home position. Controller 70 can make this determination using a number of methods, including: 1. if the drawbar is outside of the allowed home position range for longer than a predetermined time; 2. from a determination of integrated drawbar position over time, wherein when the integrated signal reaches a predetermined threshold value, the controller will return the drawbar to the home position; 3. from a measurement of loading conditions exerted on the drawbar, from a load cell or the like, and wherein a determined amount of fluid can be added to the circuit to achieve the desired drawbar home position under a known loading condition; and 4. from a drawbar loading condition determined based on factors such as engine load and gear selection, and again, wherein a determined amount of fluid can be added to the circuit to achieve the desired drawbar home position under a known loading condition. Revisiting decision block 178, if the brakes are not engaged, controller 70 will skip the step of block 180 and proceed to block 182 to energize lockout valves 132 and 134. Similarly, at decision block 184, if there is no clutch engagement, controller 70 will proceed to decision block 190.

Figure 9:
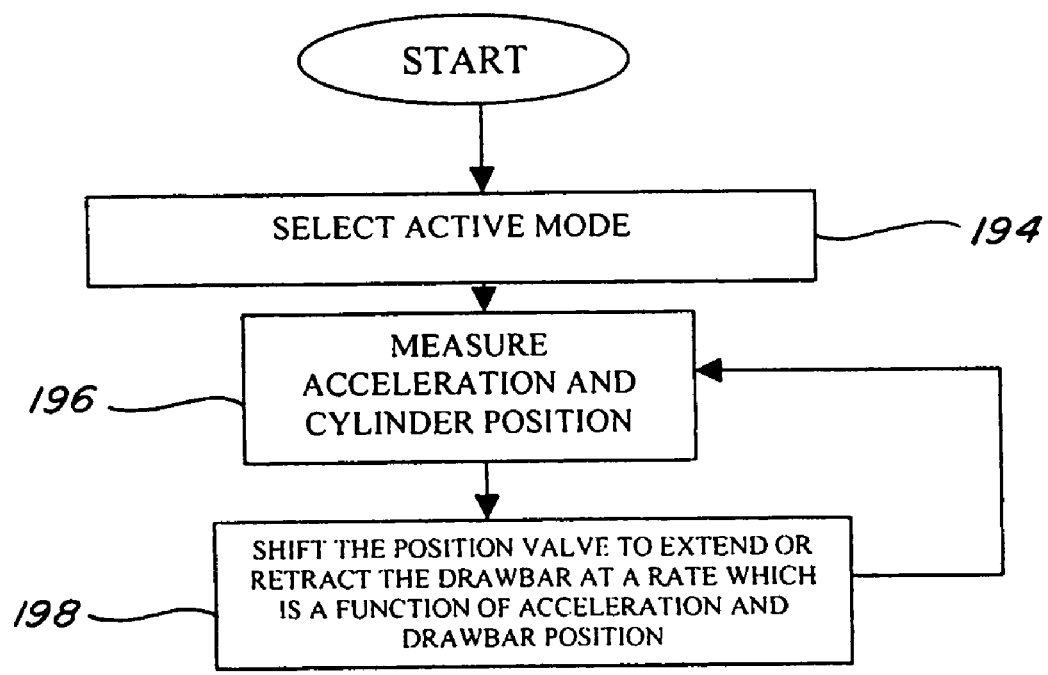
FIG. 9 is a high-level flow diagram showing steps of still another mode of operation of the control of the invention.

Referring also to FIG. 9, if the active mode is selected, as denoted at block 194, controller 70 will automatically monitor measured acceleration information which can be received from an accelerometer (not shown) or derived from information representative of cylinder position movements over time as sensed by sensor 104, as denoted by block 196, and shift the position/stiffness valves 128 and/or 130, as required for extending or retracting the drawbar at a rate which is a function of the acceleration and drawbar position, as denoted at block 198.

Again, with fluid control circuit 126 in the manual drawbar positioning mode, the operator has the ability to select the home position electrically, using either of input devices 72. Responsive to inputs received from a device 72, controller 70 will open lockout valves 132 and 134, and energize and de-energize valves 128 and 130 as required until cylinder 58 positions the drawbar at a satisfactory position.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for automatically controlling a movable drawbar of a work machine while towing a load with the drawbar, comprising steps of:
   providing structure supporting the drawbar on the work machine for allowing relative movement therebetween responsive to varying loading conditions exerted between the load and the work machine;
   monitoring information representative of a position of the drawbar in relation to a predetermined position during relative movement of the drawbar and the work machine responsive to loading conditions exerted between the load and the work machine;
   automatically repositioning the drawbar to a position within a predetermined range including the predetermined position, responsive to information representative of at least movement of the drawbar beyond the predetermined range; and
   monitoring information representative of engagement and disengagement of a brake of the work machine and automatically holding the drawbar in a position responsive to engagement of the brake, and automatically releasing the drawbar responsive to disengagement of the brake.

2. The method of claim 1, comprising additional steps of:
   providing a device operable for resiliently absorbing energy of loading conditions exerted between the load and the work machine;
   monitoring information representative of engagement and disengagement of a clutch of the work machine, and when information representative of engagement of the clutch is present, increasing a pressure condition in the device to a predetermined level for stiffening the resiliency thereof.

3. The method of claim 2, comprising an additional step of:
   when information representative of disengagement of the clutch and a predetermined condition are present, allowing the pressure condition in the accumulator to vary from the predetermined level.

4. The method of claim 3, wherein the predetermined condition is selected from a group consisting of an acceleration condition resulting from initial release of the clutch; a high engine load condition resulting from initial release of the clutch; a low travel speed; an elapsed time; and a drawbar position.

5. The method of claim 1, wherein the step of automatically repositioning the drawbar to a position within a predetermined range including the predetermined position, is performed responsive to information representative of movement of the drawbar beyond the predetermined range for longer than a predetermined time.

6. The method of claim 1, wherein the step of automatically repositioning the drawbar to a position within a predetermined range, is performed responsive to information representative of the position of the drawbar over time.

7. The method of claim 1, wherein the step of automatically repositioning the drawbar to a position within a predetermined range, is performed responsive to measured loading conditions on the drawbar.

8. The method of claim 1, wherein the step of automatically repositioning the drawbar to a position within a predetermined range, is performed responsive to loading conditions on the drawbar determined from conditions including at least a loading condition on an engine of the work machine and a selected gear of a transmission of the machine.

9. The method of claim 1, wherein the structure supporting the drawbar on the work machine allows relative movement therebetween in fore and aft directions with respect to front and rear ends of the work machine.

10. A drawbar control, comprising:
    structure supporting a drawbar in connection with a work machine for relative movements in opposite first and second directions, the drawbar being configured for attachment of a load to be towed to the work machine; and
    a fluid circuit including at least one fluid cylinder having an element in connection with the drawbar for movement therewith in the first and second directions relative to the work machine, at least one valve operable for connecting at least one pressurized accumulator with the at least one fluid cylinder, at least one valve operable for connecting a source of pressurized fluid to the at least one accumulator and to the at least one valve operable for connecting the at least one accumulator with the at least one fluid cylinder, the valves being operable for delivering pressurized fluid to the at least one fluid cylinder for moving the drawbar in the first direction relative to the work machine and in a second mode for moving the drawbar in the second direction relative to the work machine, and a controller automatically operable for controlling the valves in a selectable one of a plurality of operating modes, including:
    (a) a locked out mode for maintaining the drawbar in a predetermined home position in relation to the structure supporting the drawbar in opposition to loading conditions exerted against the drawbar;
    (b) a stiffness mode wherein the at least one accumulator is in fluid connection with the at least one fluid cylinder and a pressure condition in the at least one accumulator is controlled for providing a selectable amount of opposition to movement of the at least one fluid cylinder and the drawbar responsive to changing loading conditions exerted thereagainst; and
    (c) a position limited mode wherein the drawbar is allowed to move within a predetermined range of travel in relation to the structure supporting the drawbar responsive to loading conditions exerted against the drawbar.

11. The drawbar control of claim 10, wherein the operating modes additionally include a varying load mode wherein the valves are automatically controlled by the controller to allow fluid in the at least one fluid cylinder to be displaced therefrom resiliently opposed by a pressure condition in the at least one pressurized accumulator in fluid connection with the at least one fluid cylinder, for resiliently opposing movement of the drawbar resulting from loading conditions exerted thereagainst by a load towed by the vehicle, and wherein if the drawbar is moved by the loading conditions exerted thereagainst to a position beyond a predetermined range of positions therefor, the controller will automatically control the valves to deliver pressurized fluid from the source thereof to the at least one fluid cylinder to return the drawbar to a position within the predetermined range.

12. The drawbar control of claim 11, wherein when in the varying load mode, the controller will automatically control the valves to prevent movement of the at least one fluid cylinder and the drawbar when a brake of the machine is engaged.

13. The drawbar control of claim 11, wherein when in the varying load mode, the control or will automatically control the valves to increase a pressure condition in the at least one pressurized accumulator responsive to engagement of a clutch of the vehicle, and maintain the increased pressure condition until at least one condition representative of initial releasing of the clutch is present.

14. The drawbar control of claim 10, wherein the operating modes additionally include an active mode wherein a position representative of a position of the drawbar is monitored and a value representative of any acceleration of the drawbar relative to the work machine is determined, and the drawbar is automatically moved at a rate which is a function of at least the monitored position and the determined value representative of the acceleration of the drawbar.

15. The drawbar control of claim 10, wherein the fluid cylinder comprises a first chamber into which pressurized fluid can be introduced and contained, and a second chamber into which pressurized fluid can be introduced and contained, and the at least one valve operable for connecting an accumulator with the at least one fluid cylinder includes a first lockout valve in fluid connection with the first chamber and a first accumulator, and a second lockout valve in fluid connection with the second chamber and a second accumulator, each of the lockout valves including a valve member selectably movable as controlled by the controller between a one-way flow position which allows only fluid flow from the chamber in fluid connection with the valve, and a two way flow position which allows fluid flow to and from the chamber in connection with the valve, the controller automatically operating to move both of the first and second lockout valves to the one-way flow positions thereof when the locked out mode is selected.

16. The drawbar control of claim 15, wherein the controller will automatically operate to move both of the first and second lockout valves to the two way flow positions thereof when the stiffness mode is selected, and the at least one valve operable in a first mode for connecting a source of pressurized fluid to the at least one fluid cylinder thereto comprises:
 a first position/stiffness valve disposed in fluid connection with the first lockout valve, the first accumulator and a source of the pressurized fluid;
 a second position/stiffness valve disposed in fluid connection with the second lockout valve, the second accumulator and a source of the pressurized fluid; and
 wherein when the stiffness mode is selected, the controller will automatically operate the first and second position/stiffness valves to allow flow of the pressurized fluid to the accumulators for controlling the movement of the at least one fluid cylinder and the drawbar responsive to changing loading conditions exerted thereagainst.

17. The drawbar control of claim 16, further comprising an operator input device in connection with the controller and operable by an operator for selecting a level of opposition to the movement of the at least one fluid cylinder and the drawbar when in the stiffness mode.

18. The drawbar control of claim 10, further comprising an operator input device in connection with the controller and operable by an operator for individually selecting the operating modes.

19. A drawbar control, comprising:
 structure supporting a drawbar in connection with a work machine for relative movements in opposite first and second directions, the drawbar being configured for attachment of a load to be towed to the work machine; and
 a fluid circuit including at least one fluid cylinder having an element in connection with the drawbar for movement therewith in the first and second directions relative to the work machine, at least one valve operable for connecting at least one pressurized accumulator with the at least one fluid cylinder, at least one valve operable for connecting a source of pressurized fluid to the at least one accumulator and to the at least one valve operable for connecting the at least one accumulator with the at least one fluid cylinder, the valves being operable for delivering pressurized fluid to the at least one fluid cylinder for moving the drawbar in the first direction relative to the work machine and in a second mode for moving the drawbar in the second direction relative to the work machine, and a controller automatically operable for controlling the valves in a selectable one of a plurality of operating modes, including:
  (a) a stiffness mode wherein the at least one accumulator is in fluid connection with the at least one fluid cylinder and a pressure condition in the at least one accumulator is controlled for providing a selectable amount of opposition to movement of the at least one fluid cylinder and the drawbar responsive to changing loading conditions exerted thereagainst;
  (b) a position limited mode wherein the drawbar is allowed to move within a predetermined range of travel in relation to the structure supporting the drawbar responsive to loading conditions exerted thereagainst; and
  (c) an active mode wherein a position representative of a position of the drawbar is monitored and a value representative of any acceleration of the drawbar relative to the work machine is determined, and the drawbar is automatically moved at a rate which is a function of at least the monitored position and the determined value representative of the acceleration of the drawbar.

20. The drawbar control of claim 19, wherein the operating modes additionally include a varying load mode wherein the valves are automatically controlled by the controller to allow fluid in the at least one fluid cylinder to be displaced therefrom resiliently opposed by a pressure condition in the at least one pressurized accumulator in fluid connection with the at least one fluid cylinder, for resiliently opposing movement of the drawbar resulting from loading conditions exerted thereagainst by a load towed by the vehicle, and wherein if the drawbar is moved by the loading conditions exerted thereagainst to a position beyond a predetermined range of positions therefor, the controller will automatically control the valves to deliver pressurized fluid from the source thereof to the at least one fluid cylinder to return the drawbar to a position within the predetermined range.

21. The drawbar control of claim 19, wherein the operating modes additionally include a locked out mode for maintaining the drawbar in a predetermined home position in relation to the structure supporting the drawbar in opposition to loading conditions exerted thereagainst.

22. The drawbar control of claim 19, wherein the fluid cylinder comprises a first chamber into which pressurized fluid can be introduced and contained, and a second chamber into which pressurized fluid can be introduced and contained, and the at least one valve operable for connecting an accumulator with the at least one fluid cylinder includes a first lockout valve in fluid connection with the first chamber and a first accumulator, and a second lockout valve in fluid connection with the second chamber and a second accumulator, each of the lockout valves including a valve member selectably movable as controlled by the controller between a one-way flow position which allows only fluid flow from the chamber in fluid connection with the valve, and a two way flow position which allows fluid flow to and from the chamber in connection with the valve.

23. The drawbar control of claim 22, wherein the controller will automatically operate to move both of the first and second lockout valves to the two way flow positions thereof when the stiffness mode is selected, and the at least one valve operable in a first mode for connecting a source of pressurized fluid to the at least one fluid cylinder thereto comprises:
a first position/stiffness valve disposed in fluid connection with the first lockout valve, the first accumulator and a source of the pressurized fluid;
a second position/stiffness valve disposed in fluid connection with the second lockout valve, the second accumulator and a source of the pressurized fluid; and
wherein when the stiffness mode is selected, the controller will automatically operate the first and second position/stiffness valves to allow flow of the pressurized fluid to the accumulators for controlling the movement of the at least one fluid cylinder and the drawbar responsive to changing loading conditions exerted thereagainst.

24. The drawbar control of claim 23, further comprising an operator input device in connection with the controller and operable by an operator for selecting a level of opposition to the movement of the at least one fluid cylinder and the drawbar when in the stiffness mode.

25. The drawbar control of claim 19, further comprising an operator input device in connection with the controller and operable by an operator for selecting one of the operating modes for operation of the control.

26. A drawbar control, comprising:
structure supporting a drawbar in connection with a work machine for relative movements in opposite first and second directions, the drawbar being configured for attachment of a load to be towed to the work machine; and
a fluid circuit including at least one fluid cylinder having an element in connection with the drawbar for movement therewith in the first and second directions relative to the work machine, at least one valve operable for connecting at least one pressurized accumulator with the at least one fluid cylinder, at least one valve operable for connecting a source of pressurized fluid to the at least one accumulator and to the at least one valve operable for connecting the at least one accumulator with the at least one fluid cylinder, the valves being operable for delivering pressurized fluid to the at least one fluid cylinder for moving the drawbar in the first direction relative to the work machine and in a second mode for moving the drawbar in the second direction relative to the work machine, and a controller automatically operable for controlling the valves in a selectable one of a plurality of operating modes, including:

(a) a varying load mode wherein the valves are automatically controlled by the controller to allow fluid in the at least one fluid cylinder to be displaced therefrom resiliently opposed by a pressure condition in the at least one pressurized accumulator in fluid connection with the at least one fluid cylinder, for resiliently opposing movement of the drawbar resulting from loading conditions exerted thereagainst by a load towed by the vehicle, and wherein if the drawbar is moved by the loading conditions exerted thereagainst to a position beyond a predetermined range of positions, for longer than a predetermined time therefor, the controller will automatically control the valves to deliver pressurized fluid from the source thereof to the at least one fluid cylinder to return the drawbar to a position within the predetermined range;
(b) a stiffness mode wherein the at least one accumulator is in fluid connection with the at least one fluid cylinder and a pressure condition in the at least one accumulator is controlled for providing a selectable amount of opposition to movement of the at least one fluid cylinder and the drawbar responsive to changing loading conditions exerted thereagainst; and
(c) a position limited mode wherein the drawbar is allowed to move within a predetermined range of travel in relation to the structure supporting the drawbar responsive to loading conditions exerted against the drawbar.

27. The drawbar control of claim 26, wherein the operating modes additionally include an active mode wherein a position representative of a position of the drawbar is monitored and a value representative of any acceleration of the drawbar relative to the work machine is determined, and the drawbar is automatically moved at a rate which is a function of at least the monitored position and the determined value representative of the acceleration of the drawbar.

28. The drawbar control of claim 26, wherein the operating modes additionally include a locked out mode for maintaining the drawbar in a predetermined home position in relation to the structure supporting the drawbar in opposition to loading conditions exerted thereagainst.

29. The drawbar control of claim 26, further comprising an operator input device in connection with the controller and operable by an operator for selecting a level of opposition to the movement of the at least one fluid cylinder and the drawbar when in the stiffness mode.

30. The drawbar control of claim 26, further comprising an operator input device in connection with the controller and operable by an operator for selecting one of the operating modes for operation of the control.

31. The drawbar control of claim 26, wherein the fluid cylinder comprises a first chamber into which pressurized fluid can be introduced and contained, and a second chamber into which pressurized fluid can be introduced and contained, and the at least one valve operable for connecting an accumulator with the at least one fluid cylinder includes a first lockout valve in fluid connection with the first chamber and a first accumulator, and a second lockout valve in fluid connection with the second chamber and a second accumulator, each of the lockout valves including a valve member selectably movable as controlled by the controller between a one-way flow position which allows only fluid flow from the chamber in fluid connection with the valve, and a two way flow position which allows fluid flow to and from the chamber in connection with the valve.

32. The drawbar control of claim 31, wherein the controller will automatically operate to move both of the first and second lockout valves to the two way flow positions thereof when the stiffness mode is selected, and the at least one valve operable in a first mode for connecting a source of pressurized fluid to the at least one fluid cylinder thereto comprises:
- a first position/stiffness valve disposed in fluid connection with the first lockout valve, the first accumulator and a source of the pressurized fluid;
- a second position/stiffness valve disposed in fluid connection with the second lockout valve, the second accumulator and a source of the pressurized fluid; and wherein when the stiffness mode is selected, the controller will automatically operate the first and second position/stiffness valves to allow flow of the pressurized fluid to the accumulators for controlling the movement of the at least one fluid cylinder and the drawbar responsive to changing loading conditions exerted thereagainst.

* * * * *